United States Patent
Murayama et al.

(10) Patent No.: US 8,017,232 B2
(45) Date of Patent: Sep. 13, 2011

(54) PRESSURE-SENSITIVE ADHESIVE COMPOSITION FOR PLASMA DISPLAY AND ADHESIVE SHEET PREPARED BY FORMING THE SAME

(75) Inventors: Kenichi Murayama, Saitama (JP); Satoru Shoshi, Saitama (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 12/410,741

(22) Filed: Mar. 25, 2009

(65) Prior Publication Data

US 2009/0246516 A1    Oct. 1, 2009

(30) Foreign Application Priority Data

Mar. 28, 2008  (JP) ................................. 2008-086994
Mar. 16, 2009  (JP) ................................. 2009-062735

(51) Int. Cl.
    *B32B 15/04*    (2006.01)
(52) U.S. Cl. ............. 428/355 AC; 428/343; 428/355 R; 525/123; 525/327.8; 525/360; 525/440.01; 525/451; 526/307.6; 526/328.5
(58) Field of Classification Search .................. 525/123, 525/327.8, 360, 440.01, 451; 526/328, 328.5; 428/343, 355 R
See application file for complete search history.

(56) References Cited

U.S. PATENT DOCUMENTS

2005/0181146 A1 * 8/2005 Yoneyama et al. .......... 428/1.31
2006/0128925 A1 * 6/2006 Arai et al. ........................ 528/44

OTHER PUBLICATIONS

Shim, S.E.; Yang, S.; Jin, M.J.; Chang, Y.H.; Choe, S.; Colloid Polymer Science, 2004, 283, p. 41-48.*

* cited by examiner

*Primary Examiner* — David W Wu
*Assistant Examiner* — Robert Jones, Jr.
(74) *Attorney, Agent, or Firm* — Oblon, Spivak, McClelland, Maier & Neustadt, L.L.P.

(57) ABSTRACT

Provided is a pressure-sensitive adhesive composition for a plasma display in which a moire phenomenon can be prevented without disposing an anti-glare film and the like in order to decrease a thickness of an optical filter in a plasma display, improve a productivity of the optical filter and reduce a cost thereof and an adhesive sheet prepared by forming the same.

The pressure-sensitive adhesive composition used for an optical filter of a plasma display comprises (A) a (meth)acrylic ester base copolymer having a cross-linkable functional group in a molecule, (B) a cross-linking agent and (C) an organic fine particle in which a difference in a refractive index from that of the above (meth)acrylic ester base copolymer is 0.03 or more and which has an average particle diameter of 1 to 15 μm and an adhesive sheet prepared by forming the same.

9 Claims, No Drawings

PRESSURE-SENSITIVE ADHESIVE COMPOSITION FOR PLASMA DISPLAY AND ADHESIVE SHEET PREPARED BY FORMING THE SAME

BACKGROUND OF THE INVENTION

1. Field of the Invention

The present invention relates to a pressure-sensitive adhesive composition suitably used for an optical filter of a plasma display and an adhesive sheet prepared by forming the same.

2. Description of the Related Art

A plasma display is a device in which molecules of sealed rare gas are excited by plasma discharge between electrodes to generate a UV ray and excite a fluorescent material by the UV ray generated and in which a light in a visible light region is emitted from the fluorescent material excited to thereby display images. Since light emission is carried out by making use of plasma discharge in the above plasma display, an unnecessary electromagnetic wave having a frequency band of 30 to 130 MHz leaks to the outside, and therefore the electromagnetic wave is requested to be inhibited to the utmost from leaking so that an adverse effect is not exerted on other instruments (for example, information processing devices and the like).

Disclosed in, for example, a patent document 1 is an electroconductive mesh film which is used for an optical filter of a plasma display and in which an electroconductive fiber mesh prepared by constituting electroconductive fibers into a mesh form or an electroconductive metal mesh produced by metal such as a copper foil and the like is formed.

Further, in an optical filter of a plasma display, a contrast enhancing film is used as well in order to enhance a contrast of a screen (refer to, for example, a patent document 2).

However, when a metal mesh is used as an electromagnetic wave shielding means for an electromagnetic wave shielding film in an optical filter of a plasma display, a moire phenomenon is brought about by mutual interference between a metal mesh and a contrast enhancing film, and therefore an anti-glare film has had to be further disposed in order to prevent the moire phenomenon. In this case, the number of the films to be stuck in order to form an optical filter is increased, and therefore the problems that the optical filter is increased in a cost and reduced in a productivity and that the optical filter is increased as well in a thickness have been involved therein.

Patent document 1: Japanese Patent Application Laid-Open No. 226732/2004
Patent document 2: Japanese Patent Application Laid-Open No. 272161/2007

SUMMARY OF THE INVENTION

The present invention has been made in order to solve the problems described above, and an object of the present invention is to provide a pressure-sensitive adhesive composition for a plasma display in which a moire phenomenon can be prevented without disposing an anti-glare film and the like in order to decrease a thickness of an optical filter in a plasma display, improve a productivity of the optical filter and reduce a cost thereof and an adhesive sheet prepared by forming the same.

Intensive researches repeated by the present inventors in order to solve the problems described above have resulted in finding that the above object can be solved by using a pressure-sensitive adhesive composition having a specific blend composition. The present invention has been completed based on the above knowledge.

That is, the summary of the present invention resides in:

1. a pressure-sensitive adhesive composition used for an optical filter of a plasma display, comprising (A) a (meth)acrylic ester base copolymer having a cross-linkable functional group in a molecule, (B) a cross-linking agent and (C) an organic fine particle in which a difference in a refractive index from that of the above (meth)acrylic ester base copolymer is 0.03 or more and which has an average particle diameter of 1 to 15 µm,
2. the pressure-sensitive adhesive composition according to the above item 1, wherein the cross-linking agent of the component (B) is a polyisocyanate compound and/or a metal chelate compound,
3. the pressure-sensitive adhesive composition according to the above item 1, comprising 0.1 to 3.0 parts by mass of the organic fine particle of the component (C) based on 100 parts by mass of an adhesive resin component containing the (meth)acrylic ester base copolymer of the component (A),
4. the pressure-sensitive adhesive composition according to any of the above items 1, wherein the organic fine particle of the component (C) comprises a styrene-divinylbenzene copolymer.
5. an adhesive sheet for a plasma display prepared by forming the pressure-sensitive adhesive composition according to any of the above items 1 in a sheet form.

The present invention has made it possible to provide a pressure-sensitive adhesive composition for a plasma display which can prevent a moire phenomenon without disposing an anti-glare film and the like and an adhesive sheet prepared by forming the same. This has made it possible to decrease a thickness of an optical filter in a plasma display, enhance the productivity and reduce the cost. In particular, a commercial value of the plasma display has been enhanced more by decreasing a thickness of the optical filter.

BEST MODE FOR CARRYING OUT THE INVENTION

The pressure-sensitive adhesive composition of the present invention for a plasma display is characterized by that it is a pressure-sensitive adhesive composition used for an optical filter of a plasma display and comprises (A) a (meth)acrylic ester base copolymer having a cross-linkable functional group in a molecule, (B) a cross-linking agent and (C) an organic fine particle in which a difference in a refractive index from that of the above (meth)acrylic ester base copolymer is 0.03 or more and which has an average particle diameter of 1 to 15 µm.

Copolymers of (meth)acrylic esters in which an alkyl group of an ester part has 1 to 20 carbon atoms, monomers having a cross-linkable functional group in a molecule and other monomers used if desired can preferably be given as the (meth)acrylic ester base copolymer having a cross-linkable functional group in a molecule which is the component (A) used for the pressure-sensitive adhesive composition of the present invention.

In this respect, the examples of the (meth)acrylic esters in which an alkyl group of an ester part has 1 to 20 carbon atoms include methyl (meth)acrylate, ethyl (meth)acrylate, propyl (meth)acrylate, n-butyl (meth)acrylate, t-butyl (meth)acrylate, pentyl (meth)acrylate, hexyl (meth)acrylate, cyclohexyl (meth)acrylate, 2-ethylhexyl (meth)acrylate, isooctyl (meth)acrylate, decyl (meth)acrylate, dodecyl (meth)acrylate, myristyl (meth)acrylate, palmityl (meth)acrylate, stearyl (meth)acrylate and the like. They may be used alone or in combination of two or more kinds thereof.

The term of "(Meth)acrylic" includes both of acrylic and methacrylic.

Further, the monomers having a cross-linkable functional group in a molecule contain preferably at least one of a hydroxy group, a carboxy group, an amino group and an amide group as a functional group, and the specific examples thereof include (meth)acrylic acid hydroxyalkyl esters such as 2-hydroxyethyl (meth)acrylate, 2-hydroxypropyl (meth) acrylate, 3-hydroxypropyl(meth)acrylate, 2-hydroxybutyl (meth)acrylate, 3-hydroxybutyl(meth)acrylate, 4-hydroxybutyl(meth)acrylate and the like; acrylamides such as (meth) acrylamide, N-methyl(meth)acrylamide, N-methylol(meth) acrylamide and the like; (meth)acrylic acid monoalkylamino esters such as monomethylaminoethyl (meth)acrylate, monoethylaminoethyl (meth)acrylate, monomethylaminopropyl (meth)acrylate, monoethylaminopropyl (meth)acrylate and the like; and ethylenically unsaturated carboxylic acids such as acrylic acid, methacrylic acid, crotonic acid, maleic acid, itaconic acid, citraconic acid and the like. The above monomers may be used alone or in combination of two or more kinds thereof.

The other monomers used if desired shall not specifically be restricted as long as they are compounds copolymerizable with the monomers having a cross-linkable functional group in a molecule. They include, for example, at least one of styrene base monomers such as styrene, a-methylstyrene, vinyltoluene, vinyl benzoate and the like; nitrile base monomers such as acrylonitrile, methacrylonitrile and the like; diene base monomers such butadiene, isoprene and the like; vinyl ether base monomers such as vinylbenzyl methyl ether, vinyl glycidyl ether and the like; 1-vinyl-2-pyrrolidone; and the like.

The (meth)acrylic ester base copolymer which is used as the component (A) shall not specifically be restricted in a copolymerization form thereof, and it may be any of random, block and graft copolymers. A molecular weight thereof is preferably 500,000 or more in terms of a weight average molecular weight. If the weight average molecular weight is 500,000 or more, the adhesiveness with the adherent and the adhesion durability are sufficiently high, and lifting and peeling are less liable to be brought about. Considering the adhesiveness and the adhesion durability, the weight average molecular weight is preferably 600,000 to 2,200,000, particularly preferably 700,000 to 2,000,000.

The weight average molecular weight described above is a value reduced to polystyrene which is measured by a gel permeation chromatography (GPC) method.

Further, in the above (meth)acrylic ester base copolymer having a cross-linkable functional group in a molecule, a content of the monomer unit having a cross-linkable functional group in a molecule falls preferably in a range of 0.01 to 10% by mass based on the (meth)acrylic ester base copolymer. If the above content is 0.01% by mass or more, cross-linking is sufficiently carried out by reaction with a cross-linking agent described later, and the durability is improved. On the other hand, if it is 10% by mass or less, a reduction in the sticking aptitude to the adherent due to the too high cross-linking degree is not brought about, and therefore it is preferred. Considering the durability and the sticking aptitude to the adherent, a more preferred content of the above monomer unit having a cross-linkable functional group is 0.05 to 8.0% by mass, and it falls particularly preferably in a range of 0.2 to 8.0% by mass.

In the present invention, the above (meth)acrylic ester base copolymer of the component (A) may be used alone or in combination of two or more kinds thereof.

A method for polymerizing a polymerizable monomer comprising the (meth)acrylic ester in which an alkyl group of an ester part has 1 to 20 carbon atoms, the monomer having a cross-linkable functional group in a molecule and the other monomer used if desired shall not specifically be restricted, and an anion polymerization method, a cation polymerization method and a radical polymerization method are given. Among them, the radical polymerization method is preferred since the targeted (meth)acrylic ester base copolymer of the component (A) having a cross-linkable functional group in a molecule can be obtained at a good yield by easy operation.

A specific method for polymerizing the polymerizable monomer described above by the radical polymerization method to obtain the targeted (meth)acrylic ester base copolymer having a cross-linkable functional group in a molecule includes, for example, a method in which the polymerizable monomer and a radical polymerization initiator are added to a solvent and stirred at 60 to 120° C. for 8 to 24 hours in a reactor for polymerization.

The radical polymerization initiator described above shall not specifically be restricted and includes, for example, peroxides such as hydrogen peroxide, isobutyl peroxide, t-butyl peroxide, octanoyl peroxide, decanoyl peroxide, lauroyl peroxide, benzoyl peroxide, potassium persulfate, ammonium persulfate, sodium persulfate and the like; azo compounds such as azobisisobutyronitrile, 2,2'-azobis(4-methoxy-2,4-dimethylvaleronitrile), 2,2'-azobis(2-cyclopropylpropionitrile), 2,2'-azobis(2-methylpropionitrile), 2,2'-azobis(2-methylbutyronitrile) and the like; and redox initiators such as hydrogen peroxide-ascorbic acid, hydrogen peroxide-ferrous chloride, persulfate-sodium hydrogensulfite and the like. Among the radical polymerization initiators described above, the azo compounds such as azobisisobutyronitrile and the like are preferred.

An addition amount of the radical polymerization initiator is usually 0.05 to 1 part by mass, preferably 0.1 to 0.8 part by mass based on 100 parts by mass of the polymerizable monomer used.

The solvent used for polymerizing the polymerizable monomer shall not specifically be restricted as long as it does not disturb the polymerization reaction. It includes, for example, esters such as methyl acetate, ethyl acetate, propyl acetate, butyl acetate, methyl lactate and the like; ketones such as acetone, methyl ethyl ketone, methyl isobutyl ketone, diethyl ketone, cyclohexanone and the like; ethers such as diethyl ether, diisopropyl ether, dibutyl ether, 1,2-dimethoxyethane, tetrahydrofuran, 1,4-dioxane and the like; amides such as N,N'-dimethylformamide, N,N'-dimethylacetamide, hexamethylphosphoric acid phosphoroamide, N-methylpyrrolidone and the like; lactams such as ε-caprolactam and the like; lactones such as γ-lactone, δ-lactone and the like; sulfoxides such as dimethyl sulfoxide, diethyl sulfoxide and the like; aliphatic hydrocarbons such as pentane, hexane, heptane, octane, nonane, decane and the like; alicyclic hydrocarbons such as cyclopentane, cyclohexane, cyclooctane and the like; aromatic hydrocarbons such as benzene, toluene, xylene and the like; halogenated hydrocarbons such as dichloromethane, chloroform, carbon tetrachloride, 1,2-dichloroethane, chlorobenzene and the like; mixed solvents comprising two or more kinds of them; and the like. Among them, the esters, the ketones, the aromatic hydrocarbons and the mixed solvents comprising two or more kinds of them are preferably used.

In polymerization of a polymerizable monomer, the concentration of the polymerizable monomer preferably falls within a range of 1 to 60% by mass of the total amount of the polymerizable monomer and the solvent.

In the pressure-sensitive adhesive composition of the present invention, a tackifier may be blended, if desired, in addition to the (meth)acrylic ester base copolymer having a cross-linkable functional group in a molecule which is the component (A). The tackifier shall not specifically be restricted, and those suitably selected from compounds which have so far conventionally been used as tackifiers in pressure-sensitive adhesives can be used. The tackifier includes rosin base resins (crude rosin, hydrogenated rosin and rosin esters), xylene resins, terpene-phenol resins, petroleum resins, coumarone indene resins, terpene resins, styrene resins, ethylene/vinyl acetate resins and elastomers such as styrene-butadiene block polymers, styrene-isoprene block polymers, ethylene-isoprene-styrene block polymers, vinyl chloride/vinyl acetate base polymers, acryl base rubbers and the like.

The specific examples of commercially available products of the tackifiers described above include rosin esters such as Pine Crystal KE-359 (manufactured by Arakawa Chemical Industries Ltd.), Super Ester A-75 (manufactured by Arakawa Chemical Industries Ltd.), Super Ester A-100 (manufactured by Arakawa Chemical Industries Ltd.), Super Ester A-125 (manufactured by Arakawa Chemical Industries Ltd.) and the like, polymerized rosin esters such as Pensel D125 (manufactured by Arakawa Chemical Industries Ltd.), Pensel D160 (manufactured by Arakawa Chemical Industries Ltd.), Rikatac PCJ (manufactured by Rika Fine Tech Co., Ltd.) and the like, xylene resins such as Nikanol HP-100 (manufactured by Mitsubishi Gas Chemical Company, Inc.), Nikanol HP-150 (manufactured by Mitsubishi Gas Chemical Company, Inc.), Nikanol H-80 and the like, terpene-phenol resins such as YS Polyster T-115 (manufactured by Yasuhara Chemical Co., Ltd.), Mytec G125 (manufactured by Yasuhara Chemical Co., Ltd.) and the like, petroleum resins such as FTR-6120 (manufactured by Mitsui Chemicals, Inc.), FTR-6100 (manufactured by Mitsui Chemicals, Inc.) and the like.

The above tackifiers may be used alone or in combination of two or more kinds thereof, and among them, the rosin esters are suited from the viewpoint of a tackifying effect and the like.

A content of the tackifier added, if desired, to the pressure-sensitive adhesive composition of the present invention is not restricted and can suitably be controlled in order to obtain a desired adhesion. The content of the tackifier falls in a range of preferably 0 to 80% by mass (solid content), more preferably 0 to 40% by mass (solid content) based on the total amount of the tackifier and the (meth)acrylic ester base copolymer.

Next, the cross-linking agent which is the component (B) contained in the pressure-sensitive adhesive composition of the present invention shall be explained. The cross-linking agent of the component (B) is preferably, for example, a polyisocyanate compound, a metal chelate compound, a polyepoxy compound, a polyimine compound such as an aziridine base compound, a melamine resin, a urea resin, dialdehydes, a methylol polymer, metal alkoxide, a metal salt and the like, and it is preferably the polyisocyanate compound and/or the metal chelate compound.

In this respect, capable of being given as the examples of the polyisocyanate compound are aromatic polyisocyanates such as 2,4-tolylenediisoycanate, 2,6-tolylenediisoycanate, 1,3-xylylenediisoycanate, 1,4-xylylenediisoycanate and the like, aliphatic polyisocyanates such as hexamethylenediisoycanate and the like, alicyclic polyisocyanates such as isophoronediisoycanate, hydrogenated diphenylmethanediisoycanate and the like, biuret bodies thereof, isocyanurate bodies thereof and adducts (for example, xylylenediisoycanate base trifunctional adducts) which are reaction products with low molecular active hydrogen-containing compounds such as ethylene glycol, propylene glycol, neopentyl glycol, trimethylolpropane, castor oil and the like.

Further, the metal chelate compound includes coordinate compounds of polyvalent metals such as trisethylacetoacetatealuminum, ethylacetoacetatealuminum diisopropylate, trisacetylacetonatealuminum and the like.

The polyepoxy compound includes bisphenol A type epoxy compounds, bisphenol F type epoxy compounds, 1,3-bis(N,N-diglycidylaminomethyl)benzene, 1,3-bis(N,N-diglycidylaminomethyl)toluene, N,N,N',N'-tetraglycidyl-4,4'-diaminodiphenylmethane and the like.

The polyimine compound includes N,N'-diphenylmethane-4,4'-bis(1-aziridinecarboxyamide), trimethylolpropane-tri-β-aziridinyl propionate, tetramethylolmethane-tri-β-aziridinyl propionate, N,N'-toluene-2,4-bis(1-aziridinecarboxyamide)-triethylenemelamine and the like.

In the present invention, the cross-linking agents described above may be used alone or in combination of two or more kinds thereof. A use amount thereof is selected, though depending on the kind of the cross-linking agents, in a range of usually 0.01 to 20 parts by mass, preferably 0.1 to 10 parts by mass based on 100 parts by mass of the (meth)acrylic ester base copolymer having a cross-linkable functional group in a molecule which is the component (A).

In the organic fine particle which is the component (C) contained in the pressure-sensitive adhesive composition of the present invention, a difference in a refractive index from that of the (meth)acrylic ester base copolymer of the component (A) is 0.03 or more, preferably 0.05 or more and more preferably 0.07 or more. If a difference in the refractive index is less than 0.03, the light diffusion effect is reduced, and it is difficult to prevent a moire phenomenon. In this connection, a difference in a refractive index between the (meth)acrylic ester base copolymer and the organic fine particle is preferably 0.2 or less. Further, a difference in a specific gravity between the organic fine particle which is the component (C) and the (meth)acrylic ester base copolymer of the component (A) is preferably less than 0.5, more preferably less than 0.3 and particularly preferably less than 0.2. A difference in the specific gravity described above may be 0. Reducing a difference in the specific gravity described above makes it possible to uniformize a dispersion state of the organic fine particle in the pressure-sensitive adhesive composition, and as a result thereof, the pressure-sensitive adhesive composition for a plasma display which exerts an excellent effect for preventing a moire phenomenon can be obtained.

In addition thereto, the organic fine particle which is the component (C) is preferably a monodispersed fine particle. The monodispersed fine particles can evenly diffuse light.

Further, the organic fine particle which is the component (C) has an average particle diameter of preferably 1 to 15 μm, more preferably 2 to 10 μm and particularly preferably 3 to 5 μm. If the average particle diameter is less than 1 μm, the organic fine particles may cause secondary coagulation in a certain case, and if it exceeds 15 μm, an adverse effect may be exerted on the adhesiveness in sticking in a certain case.

The average particle diameter is a value measure by a centrifugal settling penetration method. A centrifugal automatic particle size distribution measuring instrument (trade name "CAPA-700" manufactured by HORIBA, Ltd.) is used for measurement, wherein a liquid comprising 1.2 g of the organic fine particles and 98.8 g of isopropyl alcohol is sufficiently stirred to prepare a sample for measurement.

A content of the organic fine particle which is the component (C) falls in a range of preferably 0.1 to 3.0 parts by mass, more preferably 0.1 to 2.0 parts by mass based on 100 parts by mass of the adhesive resin component comprising the (meth) acrylic ester base copolymer of the component (A) and the tackifier added if desired. If it is 0.1 part by mass or more, the effect of preventing a moire phenomenon can be provided, and if it is 3.0 parts by mass or less, an adhesion of the pressure-sensitive adhesive composition is not reduced, so that it is preferred.

Capable of being used as the organic fine particle of the component (C) are, for example, polyolefin base resin particles such as polyethylene particles, polypropylene particles and the like and polymer particles such as styrene-divinylbenzene copolymer particles, polystyrene particles, acryl base resin particles and the like, and it may be cross-linked polymer particles, for example, cross-linked styrene-divinylbenzene copolymer particles, cross-linked acryl base resin particles and the like. Further, capable of being used as well are particles comprising copolymers obtained by copolymerizing two or more kinds selected from ethylene, propylene, styrene, methyl methacrylate, benzoguanamine, formaldehyde, melamine, butadiene and the like.

Among the organic fine particles of the component (C), the styrene-divinylbenzene copolymer particles (including the cross-linked styrene-divinylbenzene copolymer particles) are preferred since they have a high transparency and provide a good light diffusion property.

The styrene-divinylbenzene copolymer particles are commercially available, and a trade name "SX-350H" and the like manufactured by Soken Chemical & Engineering Co., Ltd. are suitably used.

The pressure-sensitive adhesive composition of the present invention may contain, if desired, various additives such as a UV absorber, a light stabilizing agent, an antioxidant and the like.

The pressure-sensitive adhesive composition of the present invention is coated, after the blending matters such as the component (A), the component (B), the component (C) and the like each described above are mixed and stirred, on a support or a release sheet in a desired thickness by means of a publicly known coating device such as a knife coater, a roll knife coater, a reverse roll coater, a gravure coater, a die coater and the like, whereby an adhesive sheet for a plasma display which is molded in a sheet form can be obtained.

The adhesive sheet described above has a thickness of usually 10 to 50 μm. If it is 10 μm or more, the sufficiently high adhesive strength is obtained, and if it is 50 μm or less, the pressure-sensitive adhesive composition can suitably be prevented from protruding or bleeding from an end part of the optical filter.

The support used for the adhesive sheet of the present invention for a plasma display shall not specifically be restricted, and used are, for example, sheet-shaped plastic materials used for various optical parts, such as polyvinyl alcohol, triacetyl cellulose, polymethyl methacrylate, polycarbonate, polysulfone base resins, polynorbornene base resins and the like, and in addition thereto, used are resin films of polyethylene, polypropylene, polyethylene terephthalate, polyvinyl chloride, ethylene-vinyl acetate copolymers, polyurethane, polystyrene, polyimide and the like, papers such as wood-free paper, coated paper, laminated paper and the like, metal foils, woven fabrics, nonwoven fabrics and laminates thereof. A thickness of the above support is usually 6 to 300 μm, preferably 12 to 200 μm.

In order to protect the pressure-sensitive adhesive composition, a release sheet is usually laminated on a surface reverse to a side on which the support for the adhesive sheet of the present invention for a plasma display is provided. Used as the release sheet is, for example, a material obtained by subjecting the sheet material selected from the supports described above to release treatment with a silicone resin and the like. Further, the adhesive sheet of the present invention may assume a form in which the support described above is not used. In this case, the adhesive sheet of the present invention is used in a form in which both surfaces thereof are protected by the release sheets. A light peeling strength type release sheet and/or a heavy peeling strength type release sheet are suitably used, if necessary, as the release sheet.

EXAMPLES

Next, the present invention shall be explained in further details with reference to examples, but the present invention shall by no means be restricted by the examples shown below.

A refractive index of the organic fine particles, a refractive index of the (meth)acrylic ester base copolymer, and a total luminous transmittance (%) and a moire test of the adhesive sheet comprising the pressure-sensitive adhesive composition were evaluated according to the following methods.

<Refractive Index of Organic Fine Particles>

A refractive index standard solution was dropped on the organic fine particles put on a slide glass, and a cover glass was put thereon to prepare a sample. The sample was observed under a microscope, and a refractive index of the refractive index standard solution at which it was most difficult to observe the outlines of the organic fine particles was set to a refractive index of the organic fine particles.

<Refractive Index of (Meth)Acrylic Ester Base Copolymer>

Measured according to JIS K 7142-1996 by means of an Abbe's refractometer (Na light source, wavelength: 589 nm) manufactured by Atago Co., Ltd.

<Total Luminous Transmittance (%) of Adhesive Sheet for a Plasma Display>

Measured according to JIS K 7105-1981 by means of an integral sphere type light transmission measuring device (trade name "NDH-2000", manufactured by Nippon Denshoku Industries Co., Ltd.).

<Moire Test of Adhesive Sheet for a Plasma Display>

A light peeling strength type release film (trade name "SP-PET38 1031H (AF)", manufactured by Lintec Corporation) was peeled from the adhesive sheets for a plasma display which were prepared in the examples and the comparative example and covered on both surfaces with release films, and an adhesive surface thereof was stuck on a copper mesh surface of a copper mesh film. Next, a heavy peeling strength type release film (trade name "SP-PET38T103-1", manufactured by Lintec Corporation) covering the other surface of the adhesive sheet for a plasma display was peeled, and the sheet was stuck on the contrast enhancing film described hereinafter to thereby obtain a laminate for a plasma display.

The laminate for a plasma display described above was cut to a size of 233×309 mm by means of a cutting device (trade name "Super Cutter, PN1-600", manufactured by Hagino Seiki Co., Ltd.), and the copper mesh film side was turned to (a reverse side of) a fluorescent lamp and disposed at a distance of 30 cm from the fluorescent lamp to visually confirm a moire.

The moire was measured by five monitors; a case in which all five monitors judged that the moire was not generated was marked with ⊚; a case in which four of five monitors judged that the moire was not generated was marked with ○; a case in which one to three of five monitors judged that the moire was not generated was marked with Δ; and a case in which all five monitors judged that the moire was generated was marked with X.

The following copper mesh film and contrast enhancing film were used in Examples 1 to 3 and Comparative Example 1.

1. Copper Mesh Film

A polyethylene terephthalate film ("Cosmo Shine A4100" manufactured by Toyobo Co., Ltd.) having a thickness of 100 μm and a copper foil (trade name: BW-S, manufactured by Furukawa Circuit Foil Co., Ltd.)) having a thickness of 10 μm which was subjected on one surface thereof to blackening treatment were prepared. A surface of a side reverse to a blackening-treated surface of the copper foil described above and the polyethylene terephthalate film described above were stuck with an adhesive comprising a polyurethane resin (manufactured by Takeda Pharmaceutical Co., Ltd., mixed in a mass ratio of Takelac A310 (principal ingredient)/Takenate A10 (curing agent)/ethyl acetate=12/1/21) to prepare a laminate having a constitution of polyethylene terephthalate film/adhesive layer/copper foil.

Next, a resist solution comprising casein as a principal component was coated on a copper foil side of the laminate obtained above and dried to form a light-sensitive resin layer. It was subjected to contact exposure by a UV ray using a mask having a pattern formed thereon and developed with water after exposure, and it was subjected to curing treatment and then baked at a temperature of 100° C. to form a resist pattern. A pattern having a pitch of 300 μm and a line width of 10 μm was used as the pattern of the mask. A ferric chloride solution (Baume degree: 42, temperature: 30° C.) was sprayed from a resist pattern side onto the laminate on which the resist pattern was formed to carry out etching, and then the laminate was washed. The resist was removed with an alkaline solution, and the laminate was washed and dried after removing to obtain a copper mesh-laminated film (electromagnetic wave shielding film) having a constitution of polyethylene terephthalate film/adhesive layer/copper mesh. The copper mesh had an aperture rate of 80% and a thickness of 10 μm.

2. Contrast Enhancing Film

An ionizing radiation-curing composition was obtained by mixing 50 parts by mass of p-cumylphenoxyethyl acrylate (brand name "NK Ester ACMP-1E", solid concentration: 100% by mass, monofunctional, manufactured by Shin-Nakamura Chemical Co., Ltd.) and 50 parts by mass of ethylene oxide-modified bisphenol A diacrylate (brand name "NK Ester ABE-300", solid concentration: 100% by mass, difunctional, manufactured by Shin-Nakamura Chemical Co., Ltd.) as ionizing radiation-curing components, 3 parts by mass of 1-hydroxy-cyclohexyl phenyl ketone (Irgacure 184, solid concentration: 100% by mass, manufactured by Ciba Specialty Chemicals K.K.) as a photopolymerization initiator and 0.1 part by mass of 2-acryloyloxyethyl succinate (brand name "NK Ester A-SA", solid concentration: 100% by mass, manufactured by Shin-Nakamura Chemical Co., Ltd.) as an adhesion enhancing agent.

The ionizing radiation-curing composition thus obtained was coated on a transparent base material (brand name "Lumirror T60", thickness: 50 μm, surface roughness (Ra) 0.001 μm, manufactured by Toray Industries, Inc.) made of polyethylene terephthalate (hereinafter referred to as the PET film) by means of a knife coater so that a film thickness (targeted film thickness) of an ionizing radiation-curing layer (semi-cured state) was 100 μm. The ionizing radiation-curing composition coated staying in a state in which it was interposed between a roll die having an inversion shape formed thereon and the PET film described above was irradiated with a UV ray (a fusion H bulb used, illuminance: 400 mW/cm$^2$, luminous energy: 300 mJ/cm$^2$), whereby a lens part was formed.

A material prepared by dispersing carbon black as a light absorbing particle in the ionizing radiation-curing composition described above was filled into spaces between the lens parts formed in the step described above, and black stripes were formed by irradiating with a UV ray (a fusion H bulb used, illuminance: 400 mW/cm$^2$, luminous energy: 300 mJ/cm$^2$), whereby a contrast enhancing film was completed.

In this regard, the specification of the contrast enhancing film in the present example shall be shown below. The aperture rate shows a rate of an area through which light passes excluding those of the black stripes to the whole area when observing the contrast enhancing layer from a light emitting layer side of plasma display (PDF), and the trapezoidal taper angle is an angle formed by a gradient part in the cross section of the trapezoid and a normal line on a boundary surface (light emitting surface) between the contrast enhancing layer and the PET film.

Aperture rate: 75%
Pitch at which the lens parts were arranged: 100 μm
Refractive index of the material for the lens part: 1.56
Refractive index of the transparent resin: 1.55
Upper base width of the light absorbing part: 6 μm
Trapezoidal taper angle: 5°
Particle diameter of the light absorbing particle: 5 μm
Concentration of the light absorbing particle: 25%

Example 1

Seventy-seven parts by mass of butyl acrylate, 20 parts by mass of ethyl acrylate, 3 parts by mass of acrylic acid and 0.3 part by mass of azobisisobutyronitrile as a polymerization initiator were added to 200 parts by mass of ethyl acetate, and the mixture was stirred at 65° C. for 17 hours to thereby obtain a solution of an acrylic ester copolymer (A1) having a refractive index of 1.47, a specific gravity of 1.20, a weight average molecular weight of 800,000 and a solid concentration of 29% by mass.

Then, 0.187 part by mass of organic fine particles comprising a styrene-divinylbenzene copolymer (trade name "SX-350H", manufactured by Soken Chemical & Engineering Co. Ltd., monodispersed cross-linked particles, average particle diameter: 3.5 μm, refractive index: 1.59, specific gravity: 1.05), 4 parts by mass of an aluminum chelate base cross-linking agent (trade name "M-5A", manufactured by Soken Chemical & Engineering Co. Ltd.), 30 parts by mass of methyl ethyl ketone and 5 parts by mass of toluene each based on 100 parts by mass of the acrylic ester copolymer (A1) described above were added in order to the solution of the acrylic ester copolymer (A1) under stirring to thereby obtain a pressure-sensitive adhesive composition for a plasma display.

Next, the pressure-sensitive adhesive composition for a plasma display described above was coated on a release-treated surface side of a polyethylene terephthalate film (trade name "SP-PET38T103-1", manufactured by Lintec Corporation) which was a heavy peeling strength type release film by means of a knife coater. Then, the film was subjected to drying treatment at 90° C. for one minute to thereby obtain an adhesive sheet for a plasma display having a thickness of 25 μm on the polyethylene terephthalate film described above. Further, a light peeling type release film (trade name "SP-PET38 1031H (AF)", manufactured by Lintec Corporation) of polyethylene terephthalate was covered on a naked adhesive surface of the above adhesive sheet.

A refractive index of the organic fine particles, a refractive index of the acrylic ester copolymer obtained above, and a total luminous transmittance (%) and a moire test of the adhesive sheet for a plasma display obtained above were evaluated according to the methods described above. The results thereof are shown in Table 1.

Example 2

Firstly, 68.5 parts by mass of butyl acrylate, 30 parts by mass of methyl acrylate, 1 part by mass of 2-hydroxyethyl acrylate, 0.5 part by mass of acrylamide and 0.3 part by mass of azobisisobutyronitrile as a polymerization initiator were added to 200 parts by mass of ethyl acetate, and the mixture was stirred at 65° C. for 17 hours to thereby obtain a solution of an acrylic ester copolymer (A2) having a refractive index of 1.48, a specific gravity of 1.22, a weight average molecular weight of 800,000 and a solid concentration of 29% by mass.

Then, 0.269 part by mass of organic fine particles comprising a styrene-divinylbenzene copolymer (trade name "SX-350H", manufactured by Soken Chemical & Engineering Co. Ltd., monodispersed cross-linked particles, average particle diameter: 3.5 μm, refractive index: 1.59, specific gravity: 1.05), 0.45 part by mass of a xylylenediisocyanate base trifunctional adduct body (trade name "TD-75", manufactured by Soken Chemical & Engineering Co. Ltd.), 0.06 part by mass of 3-glycidoxypropyltrimethoxysilane (trade name "KBM403", manufactured by Shin-Etsu Chemical Co. Ltd.), 30 parts by mass of methyl ethyl ketone and 5 parts by mass of toluene each based on 100 parts by mass of the acrylic ester copolymer (A2) described above were added in order to the solution of the acrylic ester copolymer (A2) under stirring to thereby obtain a pressure-sensitive adhesive composition for a plasma display.

Next, the pressure-sensitive adhesive composition for a plasma display described above was coated on a release-treated surface side of the polyethylene terephthalate film (trade name "SP-PET38T103-1", manufactured by Lintec Corporation) which was a heavy peeling type release film by means of a knife coater. Then, the film was subjected to drying treatment at 90° C. for one minute to thereby obtain an adhesive sheet for a plasma display having a thickness of 25 μm on the polyethylene terephthalate film described above. Further, the light peeling strength type release film (trade name "SP-PET38 1031H (AF)", manufactured by Lintec Corporation) of polyethylene terephthalate was covered on a naked adhesive surface of the above adhesive sheet.

A refractive index of the organic fine particles, a refractive index of the acrylic ester copolymer obtained above, and a total luminous transmittance (%) and a moire test of the adhesive sheet for a plasma display obtained above were evaluated according to the methods described above. The results thereof are shown in Table 1.

Example 3

The solution of the acrylic ester copolymer (A2) obtained in Example 2 was used to obtain a pressure-sensitive adhesive composition for a plasma display and an adhesive sheet for a plasma display in the same manner as in Example 2, except that an addition amount of the organic fine particles (trade name "SX-350H", manufactured by Soken Chemical & Engineering Co. Ltd.) described above was changed from 0.269 part by mass to 0.029 part by mass.

A total luminous transmittance (%) and a moire test of the adhesive sheet obtained above were evaluated according to the methods described above. The results thereof are shown in Table 1.

Comparative Example 1

The solution of the acrylic ester copolymer (A1) obtained in Example 1 was used to obtain a pressure-sensitive adhesive composition for a plasma display and an adhesive sheet for a plasma display in the same manner as in Example 1, except that the organic fine particles (trade name "SX-350H", manufactured by Soken Chemical & Engineering Co. Ltd.) described above were not added.

A total luminous transmittance (%) and a moire test of the adhesive sheet obtained above were evaluated according to the methods described above. The results thereof are shown in Table 1.

TABLE 1

| | | Example | | | Comparative Example |
|---|---|---|---|---|---|
| | | 1 | 2 | 3 | 1 |
| Organic fine particles | Refractive index | 1.59 | 1.59 | 1.59 | — |
| | Average particle diameter (μm) | 3.5 | 3.5 | 3.5 | — |
| | Addition amount (part by mass) | 0.187 | 0.269 | 0.029 | — |
| Refractive index of acrylic ester copolymer | | 1.47 | 1.48 | 1.48 | 1.47 |
| Difference between refractive index of organic fine particles and refractive index of acrylic ester copolymer | | 0.12 | 0.11 | 0.11 | — |
| Adhesive sheet | Total luminous transmittance (%) | 98.5 | 97.6 | 99.2 | 99.8 |
| | Moire test result | ◎ | ◎ | ○ | X |

As shown in Table 1, total luminous transmittances were 98.5% and 97.6% respectively in the adhesive sheets prepared in Examples 1 and 2, and a moire phenomenon was not observed at all. This allowed an optical filter for a plasma display which could prevent a moire phenomenon without disposing an anti-glare film and the like to be obtained and made it possible to decrease a thickness of an optical filter, enhance a productivity of the optical filter and reduce a cost thereof.

Further, the adhesive sheet prepared in Example 3 stayed in the state that a moire phenomenon was not observed so much.

In contrast with this, a total luminous transmittance was 99.8% in Comparative Example 1, but a moire phenomenon was generated. That is, a moire phenomenon could be completely eliminated in Examples 1 and 2 while controlling a reduction in the total luminous transmittance to a level bringing about no problems on the optical filter.

INDUSTRIAL APPLICABILITY

The pressure-sensitive adhesive composition of the present invention and the adhesive sheet for a plasma display prepared by forming the same in a sheet form are suitably used as an adhesive layer for an optical filter in a plasma display.

What is claimed is:

1. A pressure-sensitive adhesive composition for use as an optical filter of a plasma display, comprising:
   a (meth)acrylic ester base copolymer comprising a cross-linkable functional group;
   a cross-linking agent; and
   organic fine particles;
   wherein:
   the organic fine particles have a refractive index that differs from a refractive index of the (meth)acrylic ester base copolymer by 0.03 or more; and
   the organic fine particles have an average particle diameter of 1 to 15 μm.

2. The pressure-sensitive adhesive composition according to claim 1, wherein the cross-linking agent comprises at least one of a polyisocyanate compound and a metal chelate compound.

3. The pressure-sensitive adhesive composition according to claim 1, comprising 0.1 to 3.0 parts by mass of the organic fine particles based on 100 parts by mass of an adhesive resin component comprising the (meth)acrylic ester base copolymer.

4. The pressure-sensitive adhesive composition according to claim 1, wherein the organic fine particles comprise a styrene-divinylbenzene copolymer.

5. An adhesive sheet for a plasma display prepared by molding the pressure-sensitive adhesive composition according to any one of claims 1 to 4 into the form of a sheet.

6. The pressure-sensitive adhesive composition according to claim 1, wherein the organic fine particles are monodisperse.

7. The pressure-sensitive adhesive composition according to claim 1, wherein the (meth)acrylic ester base copolymer comprises 0.01 to 10% by mass of a monomer comprising the cross-linkable functional group.

8. The pressure-sensitive adhesive composition according to claim 1, comprising 0.01 to 20 parts by mass of the cross-linking agent based on 100 parts by mass of the (meth)acrylic ester base copolymer.

9. The adhesive sheet according to claim 5, wherein:
the sheet comprises a first surface and a second surface;
the first surface is protected by a first release sheet; and
the second surface is protected by a second release sheet.

* * * * *